United States Patent Office 3,532,977
Patented Oct. 6, 1970

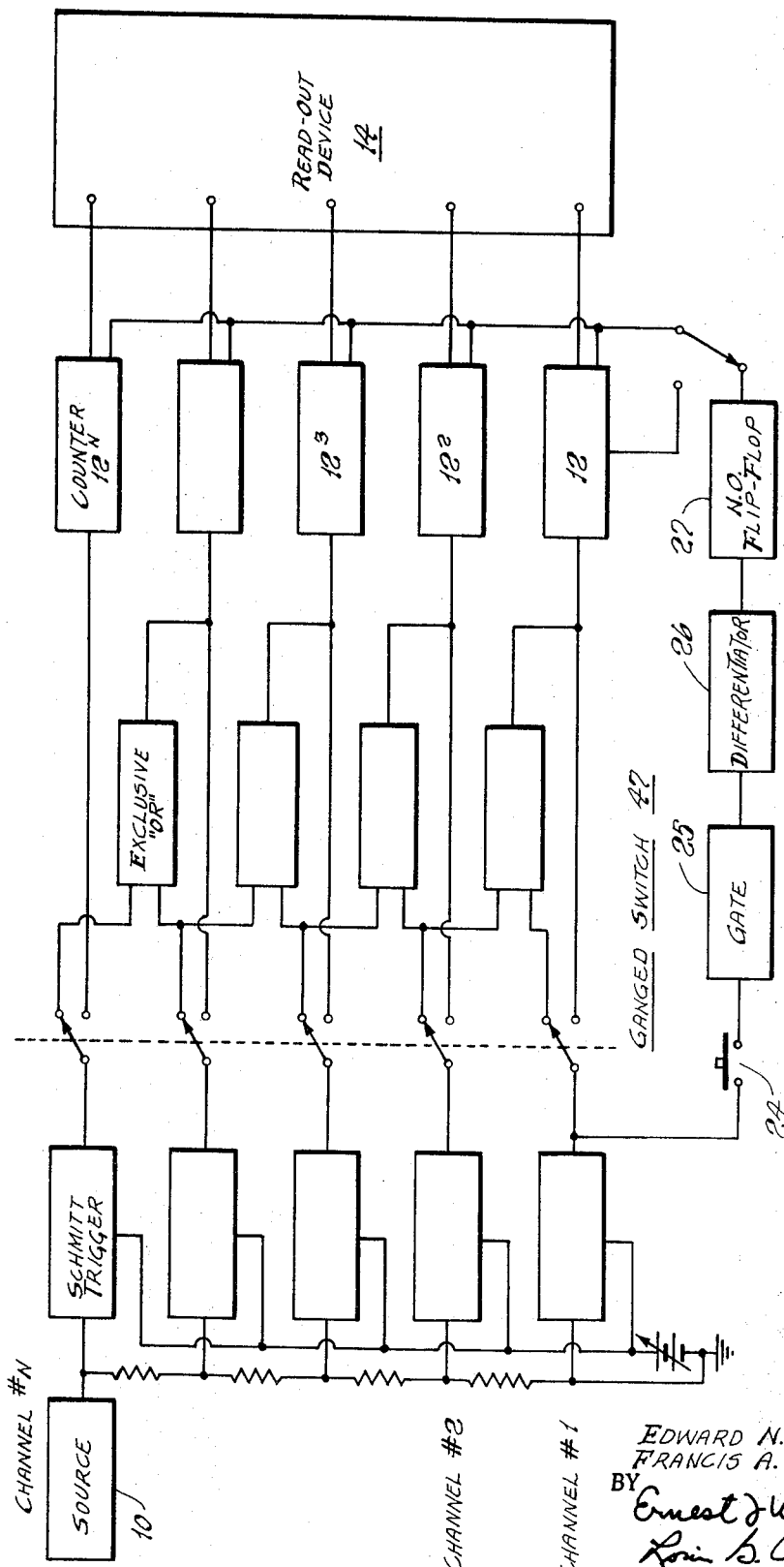

3,532,977
PULSE STATISTICAL DISTRIBUTION
ANALYZER
Francis A. Giordano, Brooklyn, and Edward N. Singer,
Jamaica, N.Y., assignors to the United States of America as represented by the Secretary of the Navy
Filed Sept. 20, 1967, Ser. No. 669,320
Int. Cl. G01r 23/16, 27/01; H03k 5/20
U.S. Cl. 324—77                                                  9 Claims

ABSTRACT OF THE DISCLOSURE

Apparatus for determining the statistical distribution of randomly varying amplitude pulses wherein a series of channels are set up, each with input level discrimination. Each channel includes a triggering network to provide identical pulses within that channel, a counter network and a readout device for totalization. One of the channels counts all the pulses received and is connected to a rest mechanism which can be preset to terminate the counting of all the channels after a specific number of input pulses or a selected time interval. The readout device is equipped to provide a direct statistical value of each channel as compared to the preset channel. The apparatus is completely independent of the level and randomness of the input pulses.

The invention described herein may be manufactured and used by or for the Government of the United States of America for governmental purposes without the payment of any royalties thereon or therefor.

BACKGROUND OF THE INVENTION

Field of the invention

The present invention relates to an apparatus for determinating the statistical distribution of random pulses of varying amplitudes, and more particularly, pertains to determining the amplitude statistical distribution of pulses relative to the total number thereof and/or over a selected time interval.

DESCRIPTION OF THE PRIOR ART

Prior art devices of the type that provide information and analysis of statistical distribution of signal amplitude are all applicable to input signals which vary rather slowly in amplitude. These systems necessitate long time signals and provide only a distribution of amplitude against time. The several equipments capable of handling pulse sequences are limited in that they are not sensitive to a series of pulses which are both random as to amplitude and time. Others that might be applicable in one case or the other do not provide a direct statistical distribution but are inherently limited to a storage operation requiring further computation. All these prior art devices have been found unsatisfactory in that they are limited as to input waveshape, randomness and indirect statistical output information.

SUMMARY OF THE INVENTION

The invention herein contemplates a device for analyzing pulse distribution of an input signal which is random with respect to both amplitude and time. The output thereof directly provides a percent indication of the pulse amplitude distribution relative to either the total number of input pulses or a selected time interval. The circuit includes a series of similar channels each having a Schmitt trigger input set to a selected level or all connected to vary the overall spectrum levels independently of the individual Schmitt triggers. The trigger input circuits are followed by a counting means which can be either digital or analog and which can be set to an upper level or can count between two preset amplitude levels. This is effectively accomplished through the use of either an "and" or an "exclusive or" circuit. Various readout circuits are employed as well as novel reset circuit arrangements.

An object of this present invention is to provide an automatic direct indicator of the statistical distribution of a series of random input pulse trains.

Another object is to provide a simple, nonmechanical, accurate, reliable and relatively inexpensive pulse distribution analyzer which can be preset to count for a selected total number of pulses or for a selected time period.

A further object is to provide a pulse distribution analyzer which is capable of independently indicating the percentage or number of random pulses which have amplitudes between selected specific limits.

Other objects and advantages will appear from the following description of an example of the invention, and the novel features will be particularly pointed out in the appended claims.

BRIEF DESCRIPTION OF DRAWINGS

In the accompanying drawings:

FIG. 5 is a block diagram of a device which combines the features of FIG. 1 and FIG. 3.

DESCRIPTION OF THE PREFERRED EMBODIMENTS

Figure 1:
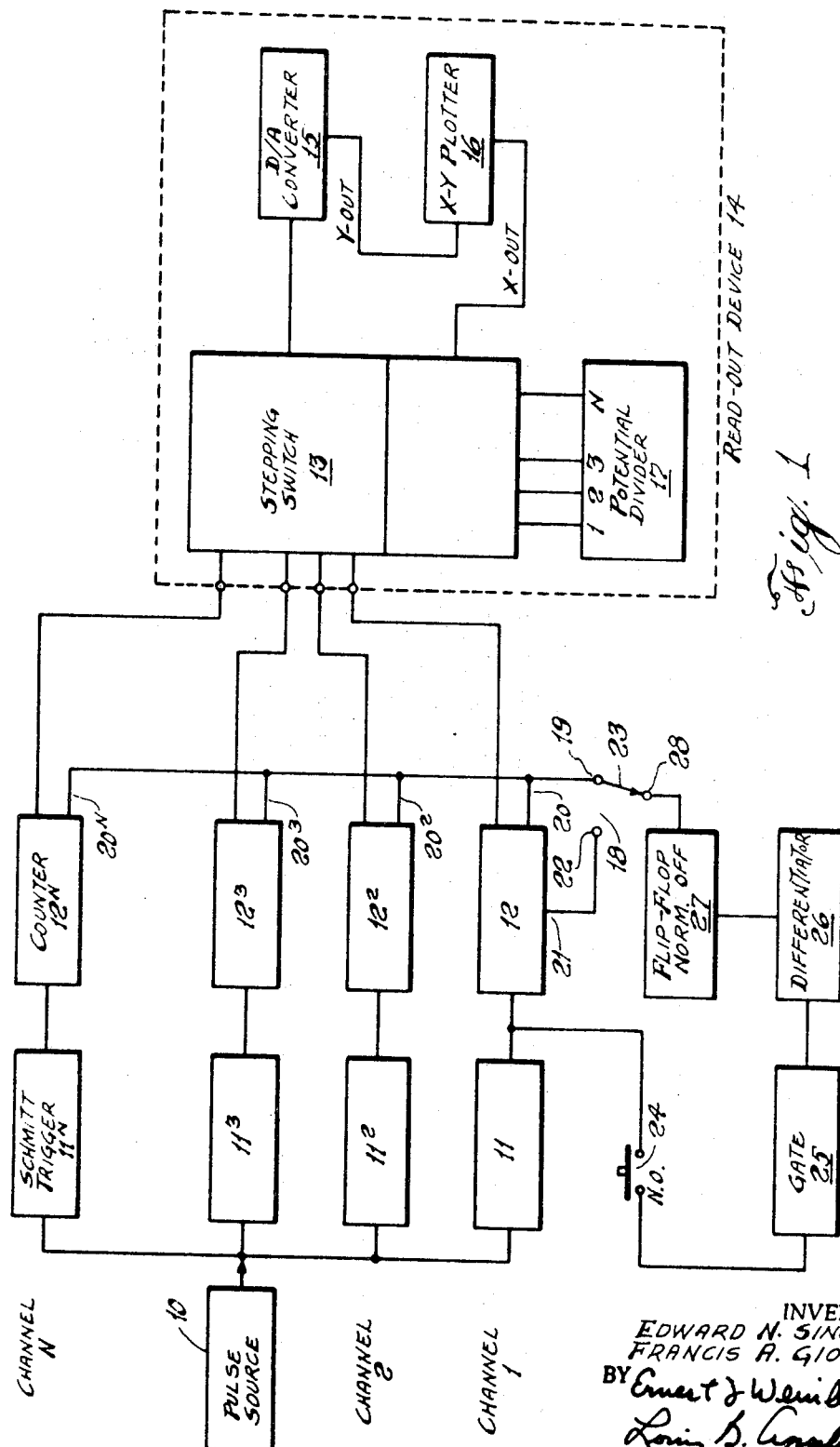
FIG. 1 is a block diagram of a pulse distribution analyzer made in accordance with the principles of this invention which employs a digital counter and an analog readout.

In the embodiment illustrated in FIG. 1, a source 10 of pulses which can be entirely random in nature is applied simultaneously to a series of Schmitt trigger circuits 11 through $11^n$. The pulse source may be any device which detects pulses such as an electromagnetic field intensity meter which is detecting the emission of some impulse noise. Generally, these pulses vary widely in both amplitude and interpulse time. Each of the Schmitt triggers is set to a one some different input level. The fundamental trigger 11 is set to respond to the lowest input amplitude level about the ambient or internal noise so that it will be triggered for every input pulse above ambient. The next trigger $11^2$ is set for some selectable level higher than that of the preceding trigger 11. Each succeeding trigger fires at a higher level with trigger $11^n$ at the highest level. If these levels are designated as $V_0$, $V_1$, $V_2$ ... $V_n$, then the digital counter 12 will count all the pulses while $12^1$ will count all those exceeding $V_1$, $12^2$ all those exceeding $V_2$ and so forth. The outputs of all the counters are applied to a scanner means which, as shown, may be a stepping switch 13 and constitutes the input for the overall readout device 14. The stepping switch 13 sequentially connects the output of each counter 12 to a digital to analog converter (D/A) 15 which, in turn, feeds its output to the "Y" input of an x-y plotter 16. Since the D/A converter 15 converts the digital count to an analog voltage amplitude and therefore, the deflection or writing of the plotter 16 is directly proportional to the count being sensed.

Also connected through and sequentially sensed by the stepping switch 13 are the outputs of potential divider 17. These outputs in their simplest form are just a series of increasing voltages (1, 2, 3 ... n) each slightly greater than the preceding. The stepping switch 13 which has two outputs connects at the same instant the output of counter 12 to the D/A converter 15 and voltage 1 to the "X" input of plotter 16, then counter $12^2$ and voltage 2, $13^3$-voltage 3, and finally $12^n$ and voltage N. Thus the plotter is deflected in the "X" axis by discrete increments in accordance with which counter is being sensed or sampled. This then is a direct indication on the plot of which channel is being applied to the plotter.

Two methods are provided for terminating the counting of the channels. One terminates the count and resets the counters after a selected number of pulses have been received by channel 1 as, for example, 100, 1000, etc. The other terminates the count after a specific time interval starting with a first input pulse. Single pole-double throw switch 18 is provided for this purpose and has its pole contact 19 connected to the control gates 20 of the counters so that when the level is changed or a pulse applied the counters terminate the counting.

Counter 12 of channel 1 is provided with an output at 21 from which emanates a pulse at the end of a specified number of counts. This can be in the last counter decade so that in changing or completing the decade (100, 1,000) produces a change of state in the last flip-flop thereof or a pulse. This output at 21 is applied to stationary contact 22 and with the pole 23 connected thereto it is fed to the control gates 20 of the counters. So that when the total number of input pulses reaches some prescribed value, the count is terminated and the counters reset.

The time controlled count is provided through a series circuit including normally open momentary switch 24, gate 25, differentiator 26, normally-off flip-flop 27 and stationary contact 28 of switch 18. One contact of switch 24 is connected to the output of Schmitt trigger 11 of channel 1 while the other is connected to the input of gate 25. When the momentary switch 24 is closed, the start pulse from trigger 11 initiates the gate and provides a pulse of a selected variable duration to the differentiator 26 which changes the state of the flip-flop to uninhibit the counters and start the counting process. When the end of the pulse is differentiated after a specified duration (duration of pulse) the state of the flip-flop is made to revert to its original state and terminate the counting through control gates 20.

Summarizing the operation of the device illustrated in FIG. 1, the output of an electromagnetic field intensity meter (timed receiver) or other suitable detector of pulses is fed into a series of Schmitt triggers (11) with each Schmitt trigger set to fire at a different input voltage; i.e., Schmitt trigger 11 is set to fire at voltage $V_1$, Schmitt trigger $11^2$ is set to fire at $V_2$, etc., and $$V_1 < V_2 < V_3 \ldots < V_n$$

The output of each Schmitt trigger is fed into a counter. Hence, counter #12 will count all those pulses which have an amplitude greater than $V_1$, counter $12^2$ those pulses with amplitude greater than $V_2$, etc. If Schmitt trigger 11 is set to fire at voltages just above the internal noise of the input receiver then counter 12 will count all pulses which are above noise. The counters can be turned off in either of two ways: (1) Counter 12 emits a pulse after a count of 100 (or any other desired count, e.g., 1000, 10,000, etc.) has been reached. This pulse turns off each counter. (Each counter, therefore measures the percentage of pulses which have amplitudes greater than the level set to fire the Schmitt trigger which is feeding that counter); (2) the output pulse of a gate, with variable pulse width, is differentiated; the differentiated trailing edge of the gate pulse triggers a flip-flop to its on state which turns off each counter (if the gate width is set to 100 divided by the PRF of the input pulses the counters will read percentage as before; however, the gate width can be set to any other predetermined width). To provide for a readout of the statistical distribution the output of the counters is fed to a stepping switch which sequentially switches each counter to a digital-to-analog converter that provides an analog voltage output corresponding to the input count. The output of the D–A converter is to the Y-input of the X–Y plotter. The stepping switch also switches-in the taps of a potential divider whose output is indicative of the counter that is switched to the D–A converter. The output of the potential divider is the X-output for the plotter. Hence, one point for each input channel is recorded on the X–Y plotter. The resulting plot is the cumulative distribution of the input pulses. The readout device can be replaced with a series of Nixie-Tubes for each counter; a digital indication of the cumulative distribution will be indicated for this type readout.

Figure 2:
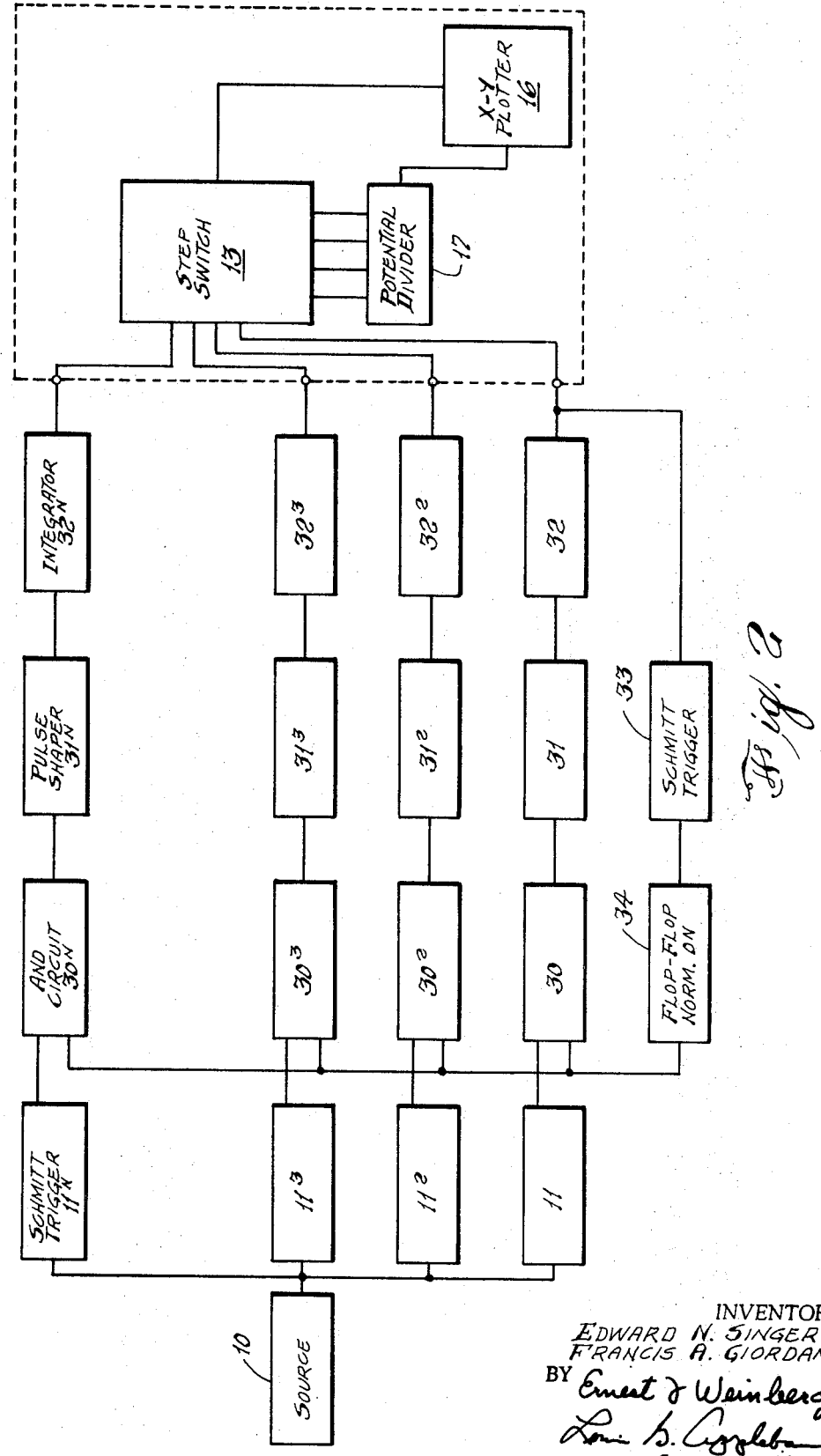
FIG. 2 is a block diagram of an analog analyzer circuit made in accordance with the principles of this invention.

Referring now to FIG. 2, wherein another embodiment of a device is illustrated, and where the input from the source is again applied to the variable level Schmitt triggers 11 of the channels, the counting circuitry in this embodiment is analog in form and comprises a standard "and" circuit 30 receiving the trigger output and having its output applied to a pulse shaper circuit 31. The shapers 31 provide at their outputs identically shaped pulses (amplitude and width) to the integrators 32. The integrators effectively provide an output amplitude level which is directly related to the number of input pulses received by that integrator. Their outputs are coupled to the stepping switch 13 with the potential divider 17 and then sampled and fed to the X–Y plotter 16 as in the prior illustrated embodiment.

The count termination system consists essentially in a feed-back loop from the output of the integrator of channel 1 which counts all the input pulses to the other input of all the "and" circuits. The Schmitt trigger 33 is set to "fire" at some selected input voltage level which can be made to correspond with the level of the integrator 32 representing a fixed number of input pulses (i.e., 100, 1,000, 10,000). The trigger output pulse is applied to the input of a normally-on flip-flop circuit 34. When the amplitude level at the integrator is sufficient to fire the trigger 33, the flip-flop 34 changes its state, and since it is now "off" it inhibits all the "and" circuits to terminate all the counting.

The basic advantage in this circuitry is that the count information is already in an analog form and requires no conversion; however, on the other hand, it is not quite as accurate as a digital counter. An operational amplifier in conjunction with a capacitor constitutes an excellent form of an integrator.

Figure 3:
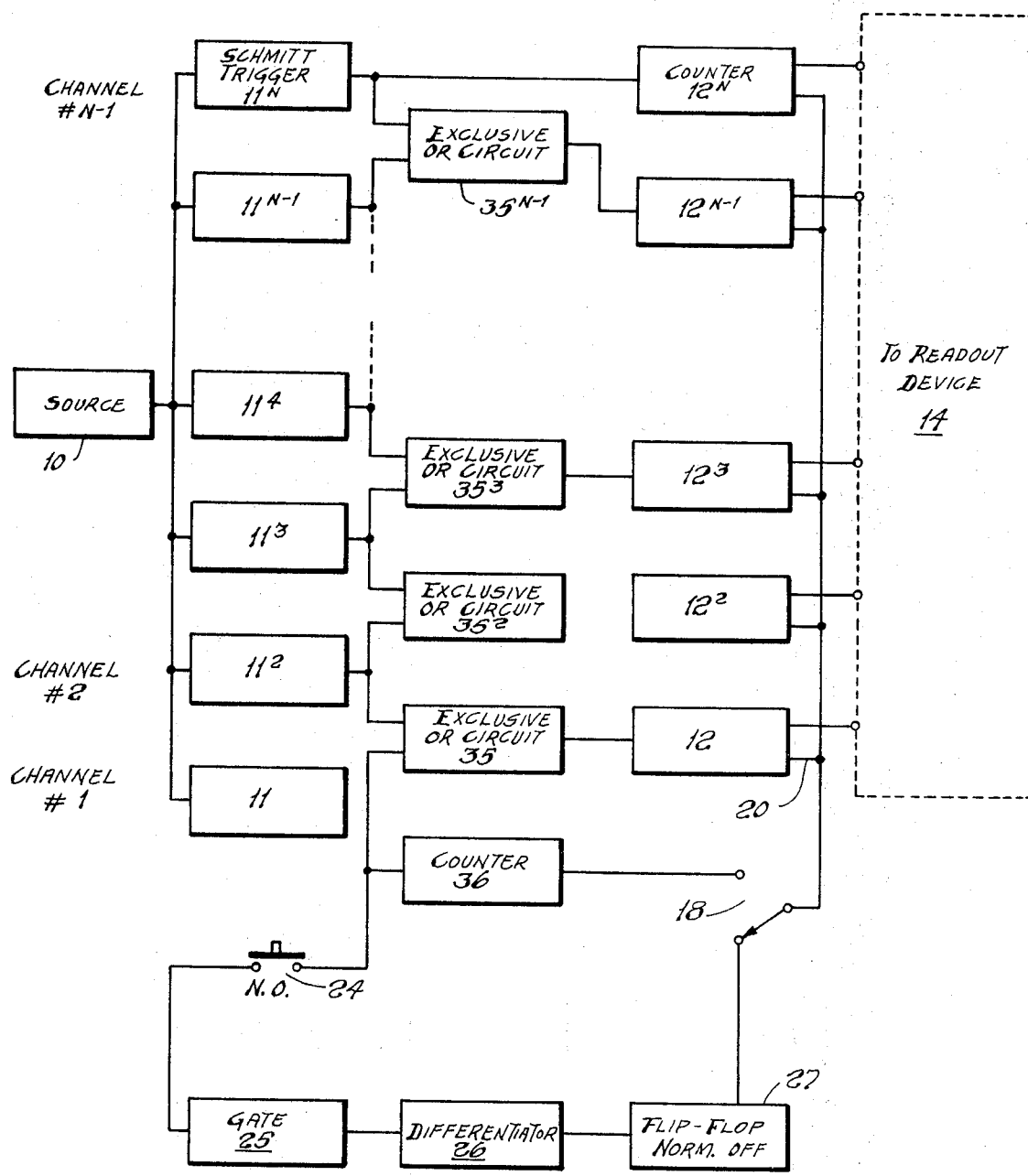
FIG. 3 is a block diagram of the digital counting circuitry of a pulse analyzer which is capable of selectively differentiating pulses of amplitudes within specified variable limits.

The device of FIG. 3 provides a figure of the probability density distribution. It is similar to that of FIG. 1 except that an "exclusive or" circuit 35 has been interposed between the Schmitt triggers 11 and the counters 12. Each "or" circuit has two inputs, one is received from the trigger of the same channel and the other from the trigger of the next higher (amplitude) channel. So that, for example, "exclusive or" 35 receives the outputs of the triggers of channels 1 and 2 whose thresholds can be set for example, at 0.1 and 0.2 volt, respectively. An output from "or" 35 would only appear if the source voltage were between 0.1 and 0.2 volt. The other "or" circuits would be inhibited so that only one "or" circuit and therefore only one counter would be activated for any one input voltage.

The device of FIG. 1 gives the cumulative distribution while the instant device provides the probability density distribution. The Schmitt triggers, as before, perform the same function. However, the outputs of each pair of adjacent Schmitt triggers are fed to an exclusive "or" circuit whose output is fed to a counter. For any one input pulse there will be an output on only one "or" circuit since the exclusive "or" circuit will give an output only when one of its inputs has a pulse on it. Therefore, counter 12 will count only those pulses with amplitude between $V_1$ and $V_2$; counter $12^2$ only those pulses between $V_2$ and $V_3$; counter $12^3$ only those pulses between $V_3$ and $V_4$, etc. As before the counters can be turned off in either of two ways: (1) Counter 36 which counts all pulses which are above noise emits a pulse after a count of 100 (or any other desired count) to turn off all counters; (2) with the variable gate as previously described. The readout technique can be as indicated previously.

Figure 4:
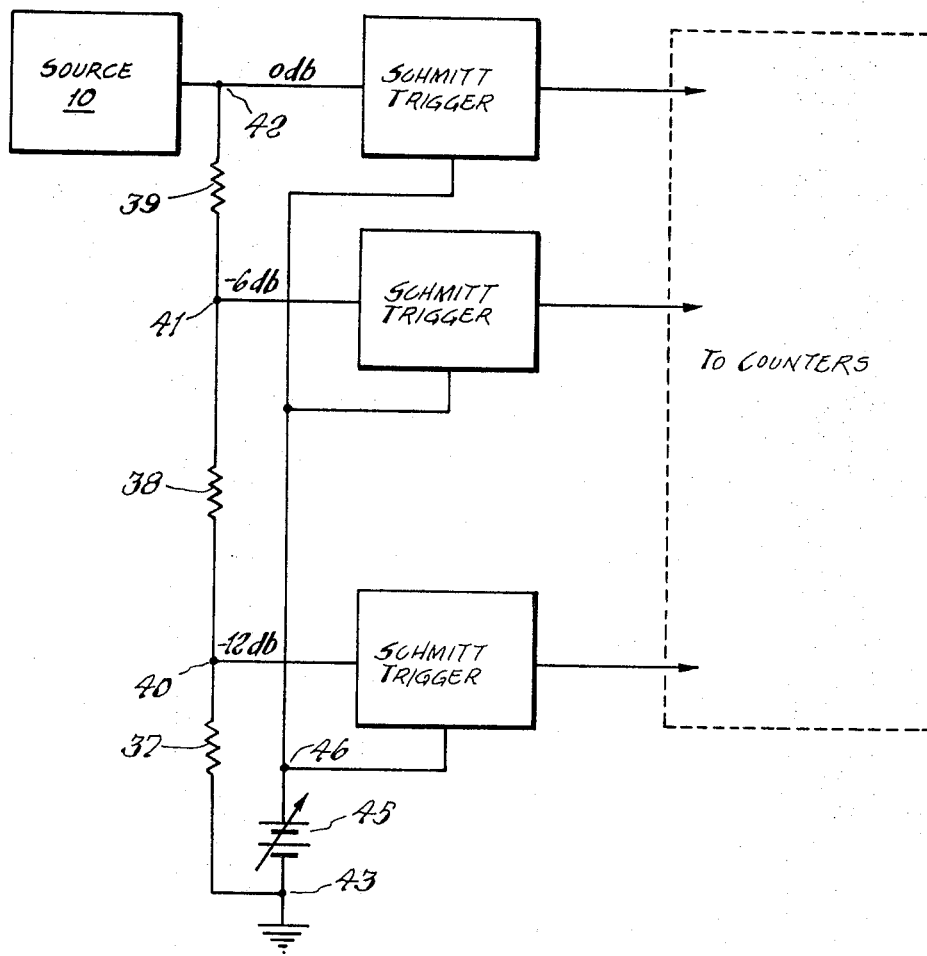
FIG. 4 is a block diagram of a circuit for varying the trigger input levels of the circuit channels to control the overall amplitude discrimination without individual adjustments and made in accordance with the principles of this invention.

In order to provide an accurate calibration technique and to obtain a succession of Schmitt trigger windows, the circuit arrangement of FIG. 4 can be added to the prior described devices. This technique incorporates the capability to shift the Schmitt trigger firing levels simultaneously so that they become more or less sensitive. The input from the pulse source is fed into a potential divider consisting of a series of resistors 37–39 or equal to the number of channels and the taps 40–42 therefrom are connected to the Schmitt trigger inputs with one end 43 thereof connected to one terminal 44 of a grounded variable D.C. potential source 45. The other terminal 46 of the potential source is applied to the bias control of each Schmitt trigger. The resistance value may be selected to provide attenuations of 0, 6, and 12 db whereby the triggers "see" only those pulses with amplitudes sufficient to overcome the threshold level after being attenuated by the potential divider. The threshold level is varied simultaneously for all the triggers by the variable bias 45 thus permitting them to "see" a variable continuous range of input pulse voltages. As for example, for one setting of the bias the range is 0.1 millivolt to 0.4 millivolt and for another it can be 0.4 millivolt to 1.6 millivolts, etc.

The illustrated embodiment of FIG. 5 combines the capabilities of the device of FIG. 1 and that of FIG. 3 in one system. The ganged switch 47, disposed between the input triggers and the "exclusive or" circuits allows for selection of either form of operation. Additionally, the bias level control arrangement of FIG. 4 has also been incorporated. Clearly this total combination can also include the analog circuitry of FIG. 2 by providing additional poles and contacts for the ganged switch 47.

We claim:
1. A multichannel pulse amplitude analyzer comprising:
a plurality of channels having their inputs connected together and each having connected therein;
a variable threshold input trigger circuit in each channel providing a fixed output pulse only when the input thereto exceeds a selected pulse amplitude level, each of said triggers set for a different input threshold;
a counter means in each channel having an input and output terminal and a control gate input, said input terminal connected to receive the output of its respective trigger circuit;
a readout means for indicating individually the number of pulse counts counted by each of said counter means, and connected to the output of said counter means; and
terminating pulse means forming a part of one of said counting means of one of said channels for providing an output pulse when said one of said counting means has reached a preset count, and having its output connected to said control gate of all of said counting means;
whereby said readout means will indicate the number of pulses of various amplitudes for a preset number of input pulses.

2. The analyzer according to claim 1, wherein said trigger circuits are Schmitt triggers and said counting means are digital counters.

3. The analyzer according to claim 2, wherein said readout means includes:
a digital to analog converter having its output connected to one input of an X–Y plotter having a pair of inputs;
a sequential switching selector disposed intermediate said digital to analog converter and the output of said counters for sequentially connecting said counters to said converter; and
indicating means connected to said plotter for indicating the output of which of said counters is being plotted.

4. The analyzer according to claim 3, wherein said indicating means includes a potential divider having a set of different amplitude outputs, said different outputs being individually connected to the other of said inputs of said plotter through said switching selector.

5. The analyzer according to claim 4, further including a series loop circuit having connected therein:
the output terminal of said Schmitt trigger set for the lowest input threshold;
a normally-off momentary switch;
a gate circuit for providing a pulse of selectable time duration;
a differentiator;
a normally-off flip-flop circuit; and
said control gates of said counters.

6. The analyzer according to claim 1, wherein said counting means is an analog counter and includes:
an "and" circuit having one of its inputs connected to the output of said trigger circuit;
a pulse shaper having its input connected to the output of said "and" circuit; and
an integrator circuit connected to receive the output of said shaper, and having the output of the lowest threshold channel integrator connected in series through another trigger circuit and a normally-on flip-flop to the other of said inputs of said "and" circuits.

7. The analyzer according to claim 5, wherein said Schmitt trigger circuits include threshold adjusting means for varying the thresholds of said Schmitt triggers simultaneously.

8. The analyzer according to claim 7, wherein said threshold means includes:
a second potential divider having its taps individually connected to the trigger inputs; and
a source of variable potential connected between said divider and the threshold inputs of said triggers.

9. The analyzer according to claim 8, further including a plurality of "exclusive or" circuits each having a pair of inputs and an output;
said "or" circuits being disposed intermediate said Schmitt trigger circuit outputs and said inputs of said counters, with one of said "or" circuit inputs connected to one trigger output and the other connected to the trigger output of the next succeeding channel.

References Cited
UNITED STATES PATENTS 3,348,031 10/1967 Russell et al.
3,360,723 12/1967 Royce.

EDWARD E. KUBASIEWICZ, Primary Examiner

U.S. Cl. X.R.

328—117